United States Patent
Nakao et al.

(10) Patent No.: US 6,865,050 B2
(45) Date of Patent: Mar. 8, 2005

(54) SERVO SIGNAL RECORDING DEVICE AND SERVO SIGNAL VERIFYING DEVICE USING EDGE DETECTION

(75) Inventors: Toru Nakao, Kanagawa (JP); Seiji Tateishi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 254 days.

(21) Appl. No.: 10/163,582

(22) Filed: Jun. 7, 2002

(65) Prior Publication Data

US 2002/0186497 A1 Dec. 12, 2002

(30) Foreign Application Priority Data

Jun. 7, 2001 (JP) .................................. 2001-172150
Jun. 7, 2001 (JP) .................................. 2001-172151

(51) Int. Cl.[7] .......................................... G11B 21/10
(52) U.S. Cl. ................................. 360/75; 360/77.12
(58) Field of Search .......................... 360/75, 77.12, 360/78.02, 261.1, 291, 241.3

(56) References Cited

U.S. PATENT DOCUMENTS

| | | | |
|---|---|---|---|
| 4,472,750 A | * | 9/1984 | Klumpp et al. .......... 360/78.02 |
| 4,639,796 A | * | 1/1987 | Solhjell .................... 360/77.12 |
| 5,050,017 A | * | 9/1991 | Carr et al. ................ 360/77.12 |
| 5,294,791 A | * | 3/1994 | Pahr ......................... 360/77.12 |
| 5,379,165 A | * | 1/1995 | Pahr ......................... 360/77.12 |
| 5,452,153 A | * | 9/1995 | Baheri et al. ............. 360/77.12 |
| 5,617,269 A | * | 4/1997 | Gordenker et al. ...... 360/77.12 |
| 6,021,013 A | * | 2/2000 | Albrecht et al. ......... 360/77.12 |
| 6,031,673 A | * | 2/2000 | Fasen et al. .............. 360/77.12 |
| 6,570,731 B2 | * | 5/2003 | Burke et al. ............. 360/77.12 |

FOREIGN PATENT DOCUMENTS

JP 2000242915 A * 9/2000

* cited by examiner

Primary Examiner—Andrew L. Sniezek
Assistant Examiner—James L Habermehl
(74) Attorney, Agent, or Firm—Sughrue Mion PLLC (57) ABSTRACT

The servo signal recording device records a servo signal onto a magnetic tape. The device includes a transporting unit for transporting the magnetic tape along its lengthwise direction, a recording unit for recording the servo signal onto the transported magnetic tape, a detecting unit for detecting an edge of the magnetic tape at a time when the servo signal is recorded and an adjusting unit for adjusting a recording position of the servo signal along a crosswise direction of the magnetic tape in accordance with a detection result of the edge of the magnetic tape by the detecting unit. The servo signal verifying device verifies a servo signal recorded onto a magnetic tape. The device includes a reproducing unit for reproducing the servo signal, a detecting unit for detecting an edge of the magnetic tape at a time when the reproducing unit reproduces the servo signal and a calculating unit for calculating a verification result of the servo signal recorded onto the magnetic tape using a reproduction result of the servo signal and a detection result of the edge.

41 Claims, 1 Drawing Sheet

SERVO SIGNAL RECORDING DEVICE AND SERVO SIGNAL VERIFYING DEVICE USING EDGE DETECTION

BACKGROUND OF THE INVENTION

1. Field of the Invention

The present invention belongs to a technical field of recording a servo signal onto a magnetic tape and verifying the servo signal recorded on the magnetic tape. More specifically, the invention relates to a servo signal recording device capable of recording the servo signal at a given position on the magnetic tape with a high degree of precision, and a servo signal verifying device capable of detecting only an error in the position at which the servo signal is recorded, to perform the verification of the servo signal with a high degree of precision.

2. Description of the Related Art

In a field where a magnetic tape is used to record information, in order to perform appropriate record/reproduction of the information, a magnetic head which records/reproduces the information (hereinafter, also referred to as recording/reproducing head) must track a recording track on the magnetic tape accurately.

On the other hand, in recent years, there is a strong demand for an increase of storage capacity. In response to this demand, there is a tendency for the width of the information recording track to become narrower, whereby it becomes difficult for the recording/reproducing head to track the recording track accurately.

In order to deal with this problem, a servo signal is recorded on the magnetic tape, and when the information is recorded/reproduced, a magnetic tape device detects the servo signal by means of a servo signal reader (hereinafter, referred to as servo head). In response to the results from the detection, the recording/reproducing head is moved crosswise across the magnetic tape, to thereby ensure the precision of the tracking of the recording track by the recording/reproducing head.

Naturally, in order for the magnetic tape to exhibit a given level of quality, it is necessary that the servo signal be recorded with great accuracy into the prescribed position.

Recording of the servo signal is typically performed while the magnetic tape is transported, as is done in ordinary recording of magnetic information. Further, a magnetic head for recording the servo signal, or other such servo signal recording units, are in a fixed position with respect to the magnetic tape transporting system. However, factors such as the degree of precision of the transporting system and fluctuations in the shape of the tape (i.e., width, thickness) cause the transported magnetic tape to move (i.e., displacement attendant on transporting occurs) in the crosswise direction at the servo signal recording position, and this causes the servo signal recording position to fluctuate along the crosswise direction.

Known methods for circumventing those problems include a method of strengthening the regulation of the crosswise movement of the magnetic tape in the magnetic tape transporting system, or uniformization of the shape of the magnetic tape, and the like.

However, when the positional regulation for the transporting system is strengthened, a strong force is borne on the edge (side portion) of the magnetic tape, and there was a problem in that deformation, breakage and the like occur in the magnetic tape, which disadvantageously results in reduced productivity and yield.

Also, uniformization of the magnetic tape shape often requires improvement of a tape application device or a slitting device or the like. Thus, there was a problem of incurring a great burden in terms of cost, labor and the like.

Further, as described above, in the manufacturing process of the magnetic tape, the magnetic tape is transported along its lengthwise direction while recording the servo signal, as is done in typical information recording. However, it is not realistically possible to completely hold the magnetic tape in the prescribed position while transporting it. Thus, at the position of the magnetic head which records the servo signal, a movement (hereinafter referred to as displacement attendant on transporting) of the magnetic tape occurs along the crosswise direction of the magnetic tape which is being transported. As a result, an error is generated in which the recording position of the servo signal moves along the crosswise direction of the magnetic tape.

Therefore, during the manufacturing of the magnetic tape, in order to ship out a product of appropriate quality, the servo signal is verified after the servo signal is recorded.

The verification of the servo signal is typically performed using a verification device, which is exclusively used for this purpose, by reproducing the recorded servo signal.

For example, in the verification device, the servo signal is reproduced by a magnetic head used for the verification (a verification head), and from the reproduction results is obtained the position (i.e., the position crosswise along the width of the magnetic tape) on the reproduced servo signal as tracked by the verification head. Further, from this position is simulated a position to be tracked by the servo head of the magnetic tape device when the corresponding magnetic tape device records/reproduces the information on the magnetic tape. The difference between the result produced by this simulation and the position where the servo head should be tracking is calculated, and the quality of the servo signal is evaluated based on this difference, thereby verifying the servo signal.

However, there was a problem in that the servo signal tracking position, which is tracked by the verification head, varies due not only to an error in the servo signal position, but also due to a variety of factors attendant on the reproduction of the servo signal by the verification device.

The conventional servo signal verification is performed in a state where these factors are overlapping, and there was a problem that the servo signal recorded on the magnetic tape could not be verified appropriately.

SUMMARY OF THE INVENTION

A primary object of the present invention is to solve the above-mentioned problems inherent in the conventional art, and to provide a servo signal recording device for recording a servo signal onto a magnetic tape, in which there is no fluctuation in a recording position as caused by displacement attendant on transporting, and which is capable of recording a highly precise servo signal.

A secondary object of the present invention is to solve the above-mentioned problems inherent in the conventional art, and to provide a servo signal verifying device for verifying the servo signal recorded on the magnetic tape, capable of performing a highly precise verification in which only an error in the position of the servo signal recorded on the magnetic tape is appropriately extracted, to thereby allow the quality of the servo signal to be appropriately evaluated to thus eliminate problems such as an erroneous determination of appropriate magnetic tape as being inappropriate, so that the evaluation of the quality of the magnetic tape and management of production thereof can be performed in a suitable fashion.

In order to attain the primary object described above, the first aspect of the present invention provides a servo signal recording device for recording a servo signal onto a longitudinal magnetic tape, comprising: transporting means for transporting the magnetic tape along its lengthwise direction; recording means for recording the servo signal onto the magnetic tape transported by the transporting means; detecting means for detecting an edge of the magnetic tape at a time when the servo signal is recorded by the recording means; and adjusting means for adjusting a position that the recording means records the servo signal to along a crosswise direction of the magnetic tape, in accordance with a detection result of the edge of the magnetic tape by the detecting means.

Preferably, the magnetic tape is used in a system in which servo control of a magnetic head is performed by using a pulse signal obtained by the servo signal reproduction, and the magnetic head records information onto the magnetic tape and reproduced the information recorded onto the magnetic tape.

Preferably, the magnetic tape is used in a system in which servo control of a magnetic head is performed by means of output strength when said servo signal is reproduced, and the magnetic head records information onto the magnetic tape and reproduced the information recorded onto the magnetic tape.

Preferably, the recording means records magnetically the servo signal onto the magnetic tape transported by the transporting means.

Preferably, the recording means includes a plurality of magnetic recording heads which are arranged so as to correspond with a plurality of servo tracks to be recorded onto said magnetic tape transported by the transporting means.

Preferably, the detecting means is any one of an edge position detecting sensor utilizing volume of transmitted light that detects the edge based on an amount of light shielded by the magnetic tape, an edge detector using a line CCD sensor and a magnetic edge detector using a magnetic resistive head.

Preferably, the detecting means detects one edge of the magnetic tape, another edge thereof or both edges thereof.

Preferably, the detecting means is arranged near to the recording means and on up-stream side along a direction in which the magnetic tape is transported.

Preferably, the adjusting means allows the recording means to move along the crosswise direction of the magnetic tape in accordance with the detection result by the detecting means.

Preferably, the adjusting means includes any one of an electric actuator using an electrostrictive material and a magnetic actuator using a magnetostrictive material.

In order to attain the secondary object described above, the second aspect of the present invention provides a servo signal verifying device for verifying a servo signal recorded onto a longitudinal magnetic tape, comprising: reproducing means for reproducing the servo signal; detecting means for detecting an edge of the magnetic tape at a time when the reproducing means reproduces the servo signal; and calculating means for calculating a result of verification of the servo signal recorded onto the magnetic tape, using a reproduction result of the servo signal by the reproducing means and a detection result of the edge of the magnetic tape by the detecting means.

Preferably, the magnetic tape is used in a system in which servo control of a magnetic head is performed by using a pulse signal obtained by the servo signal reproduction, and the magnetic head records information onto the magnetic tape and reproduced the information recorded onto the magnetic tape.

Preferably, the magnetic tape is used in a system in which servo control of a magnetic head is performed by means of output strength when the servo signal is reproduced, and the magnetic head records information onto the magnetic tape and reproduced the information recorded onto the magnetic tape.

Preferably, the reproducing means includes a magnetic head for verification which reproduces the servo signal recorded magnetically onto the magnetic tape transported by the transporting means.

Preferably, the recording means includes a plurality of verification magnetic heads which are arranged so as to correspond with a plurality of servo tracks to be recorded onto the magnetic tape transported by the transporting means.

Preferably, the detecting means is any one of an edge position detecting sensor utilizing volume of transmitted light that detects the edge based on an amount of light shielded by the magnetic tape, an edge detector using a line CCD sensor and a magnetic edge detector using a magnetic resistive head.

Preferably, the detecting means detects one edge of the magnetic tape, another edge thereof or both edges thereof.

Preferably, the detecting means is arranged near to the reproducing means.

Preferably, the calculating means corrects a tracking position of the servo signal due to the reproducing means in accordance with the detection result of the edge of the magnetic tape by the detecting means, and calculates a difference between the corrected tracking position and a reference position of the tracking position.

Preferably, a calculation result by the calculating means is performed an output shown on a display, the output of a hard copy, or both of the output shown on the display and the output of the hard copy.

DETAILED DESCRIPTION OF THE PREFERRED EMBODIMENTS

Hereinafter, detailed explanation is made of a servo signal recording device according to a first aspect of the present invention, and a servo signal verifying device according to a second aspect of the present invention, based on a preferred embodiment shown in the attached drawings.

Note that, in the following explanations, unless otherwise indicated, the term "position" refers to a position along a crosswise direction of a tape T.

First, explanation will be made of the servo signal recording device according to the first aspect of the present invention.

Figure 1:
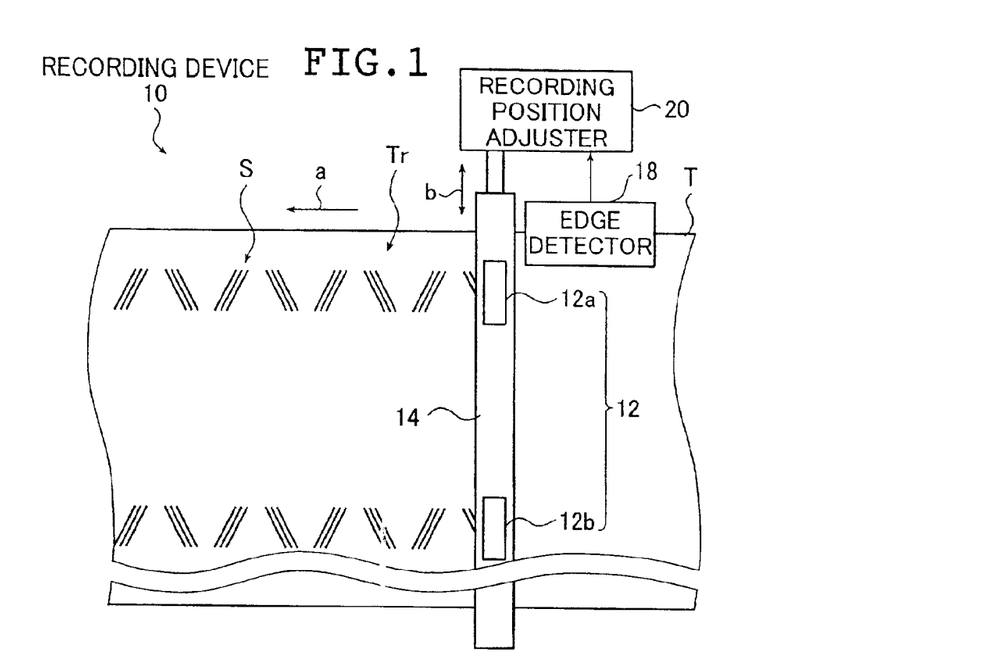
FIG. 1 is a conceptual diagram of an embodiment of a servo signal recording device according to the present invention.

FIG. 1 shows a conceptual diagram of an embodiment of the servo signal recording device in accordance with the first aspect of the present invention.

A servo signal recording device (hereinafter, referred to as recording device) 10 shown in FIG. 1 is a device which transports a long magnetic tape T (hereinafter, referred to as tape T) while recording a servo signal S by means of a servo signal recording head 12, comprising as its basic parts a head unit 14 where the servo signal recording head 12 is arranged; an edge detector 18; a recording position adjuster 20; and a tape T transporting unit (not shown) for transporting the tape T along a lengthwise direction shown by an arrow a in FIG. 1.

In the example depicted in the diagram, the tape T has a plurality of recording tracks (data tracks) along its crosswise direction (the direction indicated by arrow b in the diagram). Further, servo tracks Tr where servo signals S arranged in given patterns are aligned in the lengthwise direction are formed sandwiching the respective recording tracks. Therefore, for example in a case where the tape T has 4 recording tracks, there are 5 servo tracks Tr.

As an example, in the recording device 10 in the example shown in FIG. 1, 3 servo signals S slanted at a given angle and 3 servo signals S slanted at the same angle in the opposite direction constitute one pattern, and this pattern is repeatedly recorded to form the servo track Tr.

As is apparent from FIG. 1, on this tape T, the position in the servo signal S (the servo tracks Tr) which the magnetic head for reproducing the servo signal S is tracking at determines the timing with which the reproduced signal is outputted, or output pulse, when the servo signal S is reproduced. Further, the output pulse is determined in one-to-one correspondence with the speed at which the tape T is being transported and the tracking position on the servo signal S.

Therefore, it is possible to detect which position of the servo signal S the magnetic head is tracking at based on the pulse signal.

This is utilized in a magnetic tape device (hereinafter, referred to as an "actual machine drive") for recording/reproducing various information onto the tape T, to perform a servo control, that is, position adjustment of a magnetic head (hereinafter, also referred to as a "recording/reproducing head") for recording/reproducing the information.

For example, the center of the servo signal S serves as reference position for a magnetic head for reproducing the servo signal (hereinafter, referred to as a "servo head"), and the servo head and the recording/reproducing head are constructed in an integrated or linked fashion. Further, the servo head and the recording/reproducing head are constructed such that the servo head tracks the reference position, while the recording/reproducing head appropriately tracks the recording track.

Using the above-mentioned construction, when the information is recorded/reproduced by the recording/reproducing head, the pulse signal that is obtained by the servo head reproducing the servo signal S is used to detect which position the servo head is tracking at, and position adjustments are performed so that the servo head always tracks at the reference position, that is to say, the servo head is made to follow the reference position. This enables the recording/reproducing head to accurately track the recording track.

Note that the first aspect of the present invention is not restricted to recording the servo signal onto the tape T of the system in which the pulse signal obtained by the above-mentioned servo signal reproduction is used to perform the servo control (timing based servo system). Rather, the invention according to the first aspect is usable for recording the servo signal onto all servo-type magnetic tapes.

For example, the servo signal may be magnetically recorded onto a magnetic tape corresponding to a system in which the magnetic head servo control is performed by means of output strength when the servo signal is reproduced by the servo head.

Further, regardless of which servo type is used, the shape of the recorded servo signal is not restricted. Rather, various shapes adapted for the systems with which the magnetic tapes are used may be used.

For example, in the tape T used for the system which performs the servo control by using pulse signal as in the illustrated case, the pulse signal is not restricted to the linear shape having the angles as shown in FIG. 1. As one example, the pulse signal may have a so-called diamond shape or the like.

As described above, the head unit 14 is arranged with the servo signal recording heads 12 (hereinafter, referred to as the recording heads 12) which magnetically record the servo signal S onto the tape T. Further, although not shown, the recording signal of the servo signal S is supplied to each of the recording heads 12 of the head unit 14.

In the example shown in FIG. 1, the recording heads 12 are arranged so as to correspond with all the servo tracks Tr which are to be recorded onto the tape T. For example, in a case where 5 servo tracks Tr are to recorded on the tape T, 5 recording heads 12a, 12b, etc. are arranged in the head unit 14. However, the present invention is not restricted to this arrangement.

Further, depending on the shape of the servo signal S to be recorded or other factors, the recording heads 12, which are similar to known servo signal recording devices (servo writers), can be used.

The edge detector 18 is a sensor for detecting the edge (side portion) of the tape T while the recording heads 12 record the servo signal S. In the example shown in FIG. 1, an edge position detecting sensor that utilizes the volume of transmitted light detects the edge based on an amount of light shielded by the tape T.

Note that, in the present invention, the detector for the edge of the tape T is not limited to the illustrated edge position detecting sensor utilizing the volume of transmitted light. Rather, all varieties of edge detectors (edge portion detectors) are usable. Examples thereof include an edge detector using a line CCD sensor (image sensor), and a magnetic edge detector using a MR (Magnetic Resistive) head.

In the example shown in FIG. 1, only one edge (the edge on top in FIG. 1, which is the right side as facing the direction in which the tape is transported) of the tape T is detected. However, the present invention is not restricted to this. Rather, the edge on the opposite side may be detected, or both edges may be detected.

As described above, although not shown, the recording device 10 has the transporting unit, which transports the tape T along its lengthwise direction. There are not particular restrictions regarding the transporting unit. A publicly known transporting means using a capstan, a pinch roller, a guide member and the like may be used.

Further, the transporting speed may be determined as necessary according to the servo signal S to be recorded and the type of the tape T (that is, the corresponding magnetic tape device) and the like.

The results of the detection of the edge of the tape T, which is performed by the edge detector 18, are sent to the recording position adjuster 20.

In response to the detection results produced by the edge detector 18, the recording position adjuster 20 moves the head unit 14, that is to say, the recording heads 12 along the crosswise direction (the direction of arrow b). In the recording device 10 of the present invention, this enables the servo signal S to be recorded onto the tape T at the given position with a high degree of precision.

The servo signal S is typically recorded as the tape T is transported, but displacement of the tape T attendant on transporting thereof (displacement of the tape along the crosswise direction) which occur at the recording position causes the position where the servo signal S is recorded to fluctuate along the crosswise direction. Further, strengthening of the positional regulation during the transportation and uniformization of the tape shape may also be conceived as measures for dealing with this. However, there are a variety of problems, such as great damages being inflicted on the tape T and large cost being incurred therefor.

In contrast, in the recording device 10 of the present invention, at the time when the servo signal S is recorded, the edge position of the transported tape T is detected, and, according to the detection results, the head unit 14, that is to say, the recording heads 12 are moved in the same direction as the fluctuation of the edge position, to thereby make the recording heads 12 follow the fluctuation of the edge position of the tape T. For example, if the edge of the tape T is shifted 3 $\mu$m away from the given transporting position toward the upward direction in FIG. 1 (toward the right side as facing the direction of transportation), the head unit 14 is moved 3 $\mu$m in the same direction in response. In contrast, if the edge position of the tape T is shifted toward the bottom direction in FIG. 1, the head unit 14 is moved the same amount in the same direction.

With this, when the servo signal S is being recorded, the head unit 14 is made to follow the displacement of the edge position along the crosswise direction in response to the displacement caused during transporting of the tape, which is caused due to such factors as the degree of precision of the transporting system or the shape of the tape T. Thus, it becomes possible to record the servo signal S at a given position defined with respect to the edge of the tape, for example, or at another such given position along the width of the tape T, with a high degree of precision.

There is not particular restriction as to the method in which the head unit 14 is moved by the recording position adjuster 20. As long as the necessary amount of movement and responsiveness can be realized, a variety of methods are usable. Examples thereof include a variety of actuators such as a mechanical actuator, an electric actuator using an electrostrictive material including a piezo element and a magnetic actuator using a magnetostrictive material.

Note that, in the example shown in FIG. 1, by moving the head unit 14 arranged with all the recording heads 12, the recording heads 12 are made to follow the fluctuation of the edge position of the tape T (the displacement thereof attendant on transporting), but the present invention is not restricted to this.

For example, in response to the edge detection results, each of the recording heads 12 may also be moved independently to thereby follow the displacement attendant on transporting. Alternatively, a plurality of recording heads may be arranged concentrated as blocks and may be moved per block.

In the recording device according to the present invention which controls the recording position of the servo signal S with feedback as described above, it is preferable that the displacement attendant on transporting be detected at a position near the recording position along the direction in which the tape T is transported. Therefore, the distance between the edge detector 18 and the recording heads 12 (the servo signal recording unit) is preferably a distance at which the feedback control can be performed well, in consideration of the speed at which the tape T is transported and the responsiveness of the feedback and the like, and also, the edge detector 18 and the heads 12 are preferably arranged as near as possible in accordance with the structure of the device. Further, the position where the edge detector 18 and the heads 12 are arranged is preferably on the up-stream side along the direction in which the tape T is transported (that is, before the servo signal S is recorded).

However, in the first aspect of the present invention, the recording heads 12 do not necessarily have to follow the displacement of the tape T attendant on transporting (the edge position fluctuation) perfectly. As long as the recording heads 12 can even slightly follow the displacement of the tape T at the recording position which is attendant on transporting thereof, the position where the servo signal is recorded can be made more precise than in the conventional servo signal recording device. Therefore, in accordance with the first aspect of the present invention, the ability of the servo head to follow the servo track in the magnetic tape device for recording/reproducing the information onto the magnetic tape, is greatly improved over the conventional art, and it becomes possible to perform recording/reproduction of the information with a higher degree of precision.

Next, explanation will be made of the servo signal verifying device according to a second aspect of the present invention.

Figure 2:
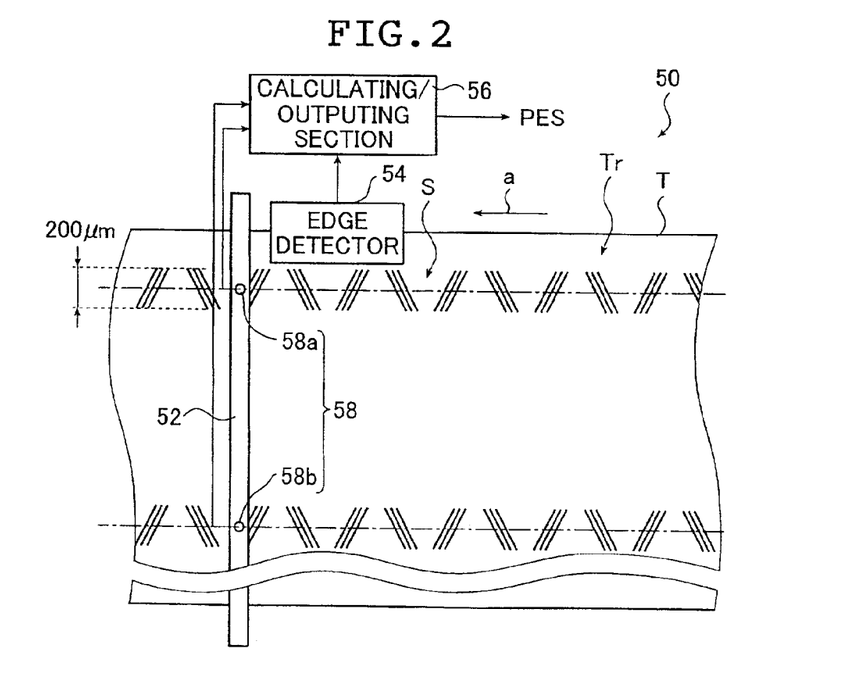
FIG. 2 is a conceptual diagram of an embodiment of a servo signal verifying device according to the present invention.

FIG. 2 is a conceptual diagram of an embodiment of the servo signal verifying device according to the second aspect of the present invention.

The servo signal verifying device (hereinafter, referred to as the verifying device) 50 shown in FIG. 2 is a device for verifying the servo signal S recorded onto the magnetic tape T, comprising as its basic parts a head unit 52; an edge detector 54; a calculating/outputting section 56; and a tape T transporting unit (not shown) for transporting the tape T along the lengthwise direction indicated by the arrow a in FIG. 2.

Similarly to the example shown in FIG. 1, in the example shown in FIG. 2, the tape T onto which the servo signal S is recorded has across the width thereof a plurality of recording tracks (data tracks) that each extend along the lengthwise direction thereof, and recorded servo tracks Tr are formed sandwiching each of the recording tracks and are constituted by recording the servo signal S aligned in a prescribed pattern.

The example shown in FIG. 2 will also be explained using the tape T, on which are formed the same servo signals S and servo tracks Tr as in the example shown in FIG. 1. Therefore, explanation of the servo control (the position adjustment) by the recording/reproducing head of the actual machine drive using the tape T is omitted below.

Note that the verifying device according to the second aspect of the present invention is not restricted to verifying the tape T of the system that performs the servo control by using the pulse signal obtained by reproducing the servo signal (timing-based servo system) as described above. Rather, the verifying device is usable with all servo-type magnetic tape servos for signal verification.

For example, the verifying device may also be used for a magnetic tape in which the magnetically recorded servo signal (the servo track) is reproduced by the servo head and the output signal strength is used to detect the position of the servo head, to thereby perform the servo control for the recording/reproducing head.

The head unit 52 has magnetic heads 58 used for reproducing (hereinafter, referred to as the verification heads) 58 which perform the verification of the servo signal.

In the example shown in FIG. 2, the verification heads 58 are arranged with respect to all the servo tracks Tr on the tape T. For example, in the case where the tape T has 5 servo tracks Tr, the head unit 52 is arranged with 5 verification heads 58a, 58b, etc. Note that the present invention is not limited to this configuration.

Further, the verification heads 58 may be similar to the servo head mounted onto the actual machine drive if they are appropriately calibrated.

In the verifying device 50, all of the verification heads 58 are arranged so as to track the center of the servo signal S (the servo tracks Tr), which is indicated by the dotted line, when there is no error in the position of the servo signal S recorded on the tape T (crosswise position suffices) and there is no displacement of the tape T attendant on transporting thereof (crosswise movement accompanying the transporting of the tape T), and the verification heads 58 are fixed into this position. Note that the tracking position of the verification heads 58 can basically be a position where the servo signal S is detectable. However, particularly in a case of a system other than the timing-based servo system as in the example shown in FIG. 2, it is preferable that the tracking position corresponds with the servo head reference position (that is, the position where the servo head is supposed to track) in the actual machine drive with which the tape T is to be used.

The edge detector 54 is a sensor for detecting the edge (side portion) of the tape T during the reproduction of the servo signal S by the verification heads 58. In the example shown in FIG. 2, an edge position detecting sensor utilizing the volume of transmitted light detects an amount of light shielded by the tape T, similarly to the edge detector 18 shown in FIG. 1.

Note that, according to the present aspect, the edge detector 54 may be similar to the edge detector 18 shown in FIG. 1, and similar edge detection may be performed.

Note that, in order to perform the verification of the servo signal S at a high degree of precision, the distance between the edge detector 54 and the head unit 52 (the verification heads 58) along the direction in which the tape T is transported is preferably as short as possible depending on the construction of the verifying device 50 and the like. The distance is preferably 30 mm or less, more preferably 20 mm or less, and particularly preferably 10 mm or less.

Further, when the distance between the head unit 52 and the closest tape guide (regulating the crosswise directional position of the tape) along the direction in which the tape T is transported is L, the distance between the edge detector 54 and the head unit 52 is preferably L/2 or less, and L/3 or less is particularly preferable.

As described above, although not shown, the verifying device 50 has the transporting unit for transporting the tape T along its lengthwise direction, similarly to the recording device 10 shown in FIG. 1. There are no particular restrictions regarding this transporting unit, and any known transporting units using a capstan, a pinch roller, a guide member and the like may be used, similarly to the recording device 10 shown in FIG. 1.

Further, the transporting speed may be determined as necessary according to the device construction and the degree of precision required in the verification, and also according to the type of the tape T (that is, the actual machine drive with which it is used), and the like.

The reproduced signal of the servo signal S produced by the verification head 58, and the tape T edge detection results produced by the edge detector 54, are sent to the calculating/outputting section 56.

The calculating/outputting section 56 uses the reproduced signal of the servo signal S produced by the verification head 58 and the edge detection results to calculate and output a position error signal (hereinafter, referred to as the PES) which indicates the quality of the servo signal S.

Hereinafter, operation of the verifying device 50 is explained, whereby a more detailed explanation is given regarding the calculating/outputting section 56 and the servo signal verifying device of the present invention.

Note that, the following explanation is made regarding one servo track and its corresponding verification head 58; however, in the verifying device 50 shown in FIG. 2, the other servo tracks and their corresponding verification heads 58 also perform the verification and calculate and output the PES in the same way.

In the verifying device 50, when the verification of the servo signal S recorded onto the tape T is performed, the tape T is transported along its lengthwise direction (the direction shown by the arrow a in FIG. 2) at a predetermined speed, while the verification head 58 reproduces the servo signal S.

The reproduced signal produced by the verification head 58 is outputted to the calculating/outputting section 56.

As described above, the verification head 58 is basically arranged so as to track the center of the servo signal S. Here, the servo signal S is not always recorded precisely at the prescribed position on the tape T. As described above, due to the displacement attendant on transporting which occurs at the time of recording the servo signal S, there are many cases where there is an error in the recorded position. Further, such displacement attendant on transporting also occurs when the verifying device 50 performs the verification.

Therefore, even if the verification head 58 is fixed/arranged so as to track at the center, the position on the servo signal S where the verification head 58 tracks will fluctuate according to the errors in the position of the servo signal and according to the displacement attendant on transporting.

The calculating/outputting section 56 uses, for example, a threshold value to obtain a binary pulse signal from the reproduced signal by the verification head 58. Based on this pulse signal, the section 56 detects which position of the servo signal S the verification head 58 is tracking at, and from this detection is obtained a position signal (hereinafter, referred to as the POS). Note that the detection of the tracking position may be performed using a well known method similar to that used with the actual machine drive mentioned above.

In the example shown in FIG. 2, as one example, it is assumed that the width of the pulse signal S, that is to say, the servo track Tr is 200 $\mu$m. Further, the edge portion of the servo signal S on the side where the edge detector 54 is arranged is represented as a position of 200 $\mu$m, and the opposite side edge is taken as 0 $\mu$m. Then, the $\mu$m position at which the verification head 58 is tracking the servo signal S is defined as the POS.

Therefore, if there is no error in the recording position of the servo signal S, and if there is no displacement of the tape T attendant on transporting thereof, then the POS will be 100 $\mu$m. In other words, in the case where the POS is not 100 $\mu$m, there is an error in the position of the servo signal S that was reproduced by the verification head 58.

In this case, as described above, in the actual machine drive, the servo head follows the servo signal S reference position to perform the servo control for the recording/reproducing head servo.

However, in the case where the fluctuations in the position of the servo signal S are extreme (that is, in the case where the fluctuations of the POS produced by the verifying device 50 are extreme) the servo head cannot follow the reference position, so it diverges therefrom.

The calculating/outputting section 56 stores a characteristic of how the servo head of the corresponding actual machine drive follows the servo track. This characteristic is stored as a function F, for example. Further, the POS indicates the position in the servo signal S which the verification head 58 being fixed is tracking at, that is to say, the POS indicates the fluctuation in the position of the servo signal S at the verification head 58 position.

When the tape T is loaded into the actual machine drive, the calculating/outputting section 56 uses the function F and the POS to calculate the position on the servo signal S which the servo head will probably track at (i.e., it simulates the position within the servo signal S which the servo head of the actual machine drive will track at).

The difference between the calculated tracking position and the reference position is defined as the PES. For example, in a case where the reference position is 100 $\mu$m, if the position tracked by the actual machine drive servo head, which is calculated from the function F and the POS, is 104 $\mu$m, then the PES will be 4 $\mu$m.

In other words, the PES is an amount of an error occurring when the servo head failed to follow the reference position due to the fluctuations in the servo signal S position. It can be determined that the more frequently the PES is somewhere other than 0, or the greater the PES, the lower is the quality of the servo signal S recorded on the tape T.

In this case, in the verifying device 50 according to the present invention, when the servo signal S is reproduced by the verification head 58, the edge detector 54 detects the position of the edge of the tape T, and this detection result is also supplied to the calculating/outputting section 56.

The calculating/outputting section 56 does not simply produce the PES from the POS. Rather, it produces the PES using the POS, which has been corrected using the results from the edge detection.

In order to accurately verify the servo signal S which has been recorded onto the tape T, it is necessary to extract only the PES caused by the error in the position of the servo signal S occurring due to the displacement attendant on transporting which occurs during the recording. In other words, it is necessary to extract the PES that is caused only by the servo signal S recorded on the tape T.

However, the displacement attendant on transporting also occurs when the verifying device 50 transports the tape T. Therefore, the POS obtained by the reproduction performed by the verification head 58 contains this displacement of the tape occurring during the transportation thereof, and the PES calculated from the POS contains the displacement attendant on transporting. Note that it is also possible to suppress the displacement attendant on transporting, by using a transportation guide or the like; however, because there are problems such as damages being caused to the edge of the tape T, it is realistically impossible to eliminate the displacement attendant on transporting.

In other words, in the verification of servo signal by the conventional method, a PES was detected, in which both the error in the servo signal S position and the displacement attendant on transporting which occurs during the verification, are superimposed. As a result, it cannot accurately verify the servo signal. Thus, various problems are caused. For example, the tape T that is actually non-defective is determined as being defective, and the tape T that is defective is determined as being non-defective.

In contrast, the verifying device 50 according to the present invention detects the position of the edge of the tape T when the servo signal is verified, and corrects the POS according to this detection result, to produce the PES using the corrected POS. As a result, it becomes possible to eliminate the influence of the displacement of the tape T attendant on transporting thereof which exists when the servo signal is verified, and thus it becomes possible to calculate the PES attributable only to the error in the position of the servo signal.

Therefore, in accordance with the present invention, it becomes possible to perform the highly precise verification in which the quality of the servo signal S that is recorded on the tape T is evaluated accurately, enabling a good performance of quality management and production management in the manufacturing process of the tape T.

There are no particular restrictions regarding the method for using the edge detection results to correct the POS, and various methods may be used.

For example, an example is shown in which "0" is the correct position of the edge when the tape T is transported in a proper manner, and in which a displacement amount x is negative in the case where the edge position has shifted away from the correct position in the direction toward the top of the diagram (the side on which the value of the servo signal S is greater), and in which the displacement amount x is positive in the case where the edge position has shifted toward the opposite side, and where this displacement amount is subtracted from the POS and the resulting value is used to calculate the PES:

$$PES = \text{reference position} - [F(POS - (\pm \text{displacement amount } x))]$$

Note that there are no particular restrictions regarding the method by which the PES is outputted at the calculating/outputting section 56. Rather, a variety of methods may be used, such as outputting it on a display or as a hard copy, or as both an output shown on a display and a hardcopy.

The outputted PES is used to perform the quality evaluation regarding the servo signal S recorded on the tape T. For example, in a case where an amount of an area where the PES is not 0 exceeds a threshold, or in a case where there were more than a given number of places where the PES exceeded the threshold, the tape T is considered as defective, and processing is performed to rerecord the servo signal S, for example.

In the above-mentioned example, the verification heads 58 (the head unit 52) are fixed in place; however, the present invention is not limited to this. Rather, the verification heads 58 can be made to follow the servo signal S to perform the same verification.

However, in the construction in which the verification heads 58 are made to follow the servo signal S, there may arise instability factors attributable to such things as individual differences among the verification heads in following the servo signal. Further, the fixed-type head such as the one shown in FIG. 2 is more advantageous also in terms of costs, the construction of the verifying device, the size of the verifying device, and the like.

Further, in light of this point, when the verification heads are constructed as the type, which follows the servo signal, it is preferable that the verification heads can follow the servo signal closely enough to prevent diversion from the servo signal. Furthermore, one verification head follows the servo signal, or the servo signal is followed using an average of a plurality of verification heads, and the servo signal S reproduction result and the edge detection result are used to calculate the POS and the PES of each of the servo tracks.

The servo signal recording device and the servo signal verifying device according to the first aspect and the second aspect of the present invention have been described in detail above; however, the present invention is not limited to the above-mentioned embodiments, and it goes without saying that various improvements and alterations may be made without departing from the scope of the gist of the present invention.

For example, in the servo signal verifying device shown in FIG. 2, the quality of the servo signal is measured using the PES. However, in addition to this configuration, the absolute position of the servo signal (its distance from the edge of the tape, for example) may be calculated based on the POS and the position of the verification head, and this absolute position may be used to evaluate the quality of the servo signal.

As described in detail above, in accordance with the servo signal recording device according to the first aspect of the present invention, the servo signal can be recorded at the given position along the crosswise direction of the magnetic tape with a high degree of precision, regardless of the displacement attendant on transporting which occurs when the servo signal is recorded.

Further, as described above in detail, in accordance with the servo signal verifying device according to the second aspect of the present invention, only the error in the servo signal position itself, which occurred when the servo signal was recorded, is properly extracted to perform the verification of the servo signal. Therefore, for example, in the manufacturing process of the magnetic tape, the evaluation of the quality of the servo signal can be performed properly, whereby the quality management and the production management can be performed well.

What is claimed is:

1. A servo signal recording device for recording a servo signal onto a longitudinal magnetic tape, comprising:

transporting means for transporting said magnetic tape along its lengthwise direction;

recording means for recording said servo signal onto said magnetic tape transported by said transporting means;

detecting means for detecting an edge of said magnetic tape at a location in the lengthwise direction where said servo signal is to be recorded by said recording means; and adjusting means for adjusting a position that said recording means records said servo signal to along a crosswise direction of said magnetic tape at the location before the recording, in accordance with a detection result of said edge of said magnetic tape by said detecting means, wherein said detecting means is arranged near to said recording means and on up-stream side along the lengthwise direction in which said magnetic tape is transported.

2. The servo signal recording device according to claim 1, wherein said magnetic tape is used in a system in which servo control of a magnetic head is performed by using a pulse signal obtained by servo signal reproduction, and said magnetic head records information onto said magnetic tape and reproduced said information recorded onto said magnetic tape.

3. The servo signal recording device according to claim 2, wherein a diamond-shaped pulse signal is used to perform servo control of said magnetic head.

4. The servo signal recording device according to claim 1, wherein said magnetic tape is used in a system in which servo control of a magnetic head is performed by means of output strength when said servo signal is reproduced, and said magnetic head records information onto said magnetic tape and reproduced said information recorded onto said magnetic tape.

5. The servo signal recording device according to claim 1, wherein said recording means records magnetically said servo signal onto said magnetic tape transported by said transporting means.

6. The servo signal recording device according to claim 1, wherein said recording means includes a plurality of magnetic recording heads which are arranged so as to correspond with a plurality of servo tracks to be recorded onto said magnetic tape transported by said transporting means.

7. The servo signal recording device according to claim 1, wherein said detecting means is any one of an edge position detecting sensor utilizing volume of transmitted light that detects said edge based on an amount of light shielded by said magnetic tape, an edge detector using a line CCD sensor and a magnetic edge detector using a magnetic resistive head.

8. The servo signal recording device according to claim 1, wherein said detecting means detects one edge of said magnetic tape, another edge thereof or both edges thereof.

9. The servo signal recording device according to claim 1, wherein said adjusting means includes any one of an electric actuator using an electrostrictive material and a magnetic actuator using a magnetostrictive material.

10. The servo signal recording device according to claim 1, wherein said detecting means comprises an edge detector using a line CCD sensor.

11. The servo signal recording device according to claim 1, wherein said detecting means comprises a magnetic edge detector using a magnetic resistive head.

12. The servo signal recording device according to claim 1, wherein said detecting means detects both longitudinal edges of said magnetic tape.

13. The servo signal recording device according to claim 1, wherein said recording means records said servo signal onto said magnetic tape such that said magnetic tape has a recorded line of a predetermined length of the servo signal, and wherein the line is slanted at a given angle in the lengthwise direction.

14. The servo signal recording device according to claim 1, wherein said recording means records said servo signal onto said magnetic tape such that said magnetic tape has a recorded pattern of the servo signal, the pattern repeatedly formed by a pair of a first recorded line of a predetermined length and a second recorded line of the predetermined length, the first recorded line and the second recorded line are slanted at a given angle in the lengthwise direction in opposite directions respectively.

15. The servo signal recording device according to claim 1, wherein said recording means comprises a recording head and said detecting means comprises an edge detector, wherein the recording head and the edge detector are arranged as different devices.

16. A servo signal verifying device for verifying a servo signal recorded onto a longitudinal magnetic tape, comprising:

reproducing means for reproducing said servo signal;

detecting means for detecting an edge of said magnetic tape at a time when said reproducing means reproduces said servo signal; and calculating means for calculating a result of verification of said servo signal recorded onto said magnetic tape, using a reproduction result of said servo signal by said reproducing means and a detection result of said edge of said magnetic tape by said detecting means.

17. The servo signal verifying device according to claim 16, wherein said magnetic tape is used in a system in which servo control of a magnetic head is performed by using a pulse signal obtained by said servo signal reproduction, and said magnetic head records information onto said magnetic tape and reproduced said information recorded onto said magnetic tape.

18. The servo signal verifying device according to claim 16, wherein said magnetic tape is used in a system in which servo control of a magnetic head is performed by means of output strength when said servo signal is reproduced, and said magnetic head records information onto said magnetic tape and reproduced said information recorded onto said magnetic tape.

19. The servo signal verifying device according to claim 16, wherein said reproducing means includes a magnetic head for verification which reproduces said servo signal recorded magnetically onto said magnetic tape transported by said transporting means.

20. The servo signal verifying device according to claim 16, wherein said recording means includes a plurality of verification magnetic heads which are arranged so as to correspond with a plurality of servo tracks to be recorded onto said magnetic tape transported by said transporting means.

21. The servo signal verifying device according to claim 16, wherein said detecting means is any one of an edge position detecting sensor utilizing volume of transmitted light that detects said edge based on an amount of light shielded by said magnetic tape, an edge detector using a line CCD sensor and a magnetic edge detector using a magnetic resistive head.

22. The servo signal verifying device according to claim 16, wherein said detecting means detects one edge of said magnetic tape, another edge thereof or both edges thereof.

23. The servo signal verifying device according to claim 16, wherein said detecting means is arranged near to said reproducing means.

24. The servo signal verifying device according to claim 16, wherein said calculating means corrects a tracking position of said servo signal due to said reproducing means in accordance with said detection result of said edge of said magnetic tape by said detecting means, and calculates a difference between the corrected tracking position and a reference position of said tracking position.

25. A recording device, comprising:

recording head that records a servo signal onto a magnetic tape, said recording head recording all the servo signals that are recorded onto said magnetic tape; and a control circuit that detects an edge of said magnetic tape at a location in the lengthwise direction where each of said servo signals is recorded and that adjusts a position that said recording head records each of said servo signals onto said magnetic tape at the location before the recording, in accordance with said detected edge, wherein the control circuit is arranged near the recording head and on an up-stream side along the lengthwise direction in which the magnetic tape is transported.

26. The recording device according to claim 25, wherein servo control is performed on the recording head by using a pulse signal obtained by servo signal reproduction.

27. The servo signal recording device according to claim 25, wherein servo control is performed on the recording head is performed based on an output strength of said servo signal when said servo signal is reproduced.

28. The servo signal recording device according to claim 25, wherein said recording head magnetically records said servo signal onto said magnetic tape.

29. The servo signal recording device according to claim 25, wherein said recording head comprises a plurality of magnetic recording heads which are arranged so as to correspond with a plurality of servo tracks to be recorded onto said magnetic tape.

30. The servo signal recording device according to claim 25, wherein said control circuit detects said edge of the magnetic tape via one of a sensor that utilizes volume of transmitted light to detects said edge based on an amount of light shielded by said magnetic tape, a CCD sensor, and a magnetic resistive head.

31. The servo signal recording device according to claim 25, wherein said control circuit detects a first edge of said magnetic tape, a second edge of the magnetic tape, or both the first and second edges of the magnetic tape.

32. The servo signal recording device according to claim 25, wherein said control circuit adjusts said position that said recording head records said servo signal via any one of an electric actuator using an electrostrictive material and a magnetic actuator using a magnetostrictive material.

33. A servo signal verifying device, comprising:

a head that reproduced a servo signal from a magnetic tape; and a control circuit that detects an edge of said magnetic tape at a time when said head reproduces said servo signal and that verifies said servo signal recorded onto said magnetic tape by analyzing said servo signal, which has been reproduced, and based on said detected edge of said magnetic tape.

34. The servo signal verifying device according to claim 33, wherein servo control is performed on said head by using a pulse signal obtained by said servo signal reproduction.

35. The servo signal verifying device according to claim 33, wherein servo control is performed on said head based on an output strength of said servo signal when said servo signal is reproduced.

36. The servo signal verifying device according to claim 33, wherein said head includes a magnetic head which reproduces said servo signal recorded magnetically onto said magnetic tape.

37. The servo signal verifying device according to claim 33, wherein said head includes a plurality of magnetic heads which are arranged so as to correspond with a plurality of servo tracks to be recorded onto said magnetic tape.

38. The servo signal verifying device according to claim 33, wherein said control circuit detects said edge via any one of a sensor that utilizes volume of transmitted light that detects said edge based on an amount of light shielded by said magnetic tape, a CCD sensor and a magnetic edge detector using a magnetic resistive head.

39. The servo signal verifying device according to claim 33, wherein said control circuit detects a first edge of said magnetic tape, a second edge of said magnetic tape, or said first and second edges of the magnetic tape.

40. The servo signal verifying device according to claim 33, wherein said control circuit detects the edge of the magnetic tape via a detector that is arranged near to said head.

41. The servo signal verifying device according to claim 33, wherein said control circuit corrects a tracking position of said servo signal due to said head in accordance with said detected edge of said magnetic tape and calculates a difference between the corrected tracking position and a reference position of said tracking position.

* * * * *